(12) United States Patent
Johnson et al.

(10) Patent No.: US 10,495,218 B2
(45) Date of Patent: Dec. 3, 2019

(54) VARIABLE DISPLACEMENT HYDRAULIC PUMP WITH TORQUE SENSING AND METHOD THEREOF

(71) Applicant: Schaeffler Technologies AG & Co. KG, Herzogenaurach (DE)

(72) Inventors: Joseph Johnson, Mooresville, NC (US); Jonathan Richards, Waxhaw, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 203 days.

(21) Appl. No.: 15/630,416

(22) Filed: Jun. 22, 2017

(65) Prior Publication Data

US 2018/0372217 A1    Dec. 27, 2018

(51) Int. Cl.
*F04B 1/32* (2006.01)
*F16H 61/46* (2010.01)
*F16H 61/468* (2010.01)
*E02F 9/22* (2006.01)
*F16H 61/00* (2006.01)

(52) U.S. Cl.
CPC ........... *F16H 61/46* (2013.01); *F16H 61/468* (2013.01); *E02F 9/2235* (2013.01); *E02F 9/2296* (2013.01); *F04B 1/328* (2013.01); *F15B 2211/20553* (2013.01); *F16H 61/0025* (2013.01)

(58) Field of Classification Search
CPC ...................................................... F04B 1/328
See application file for complete search history.

(56) References Cited

U.S. PATENT DOCUMENTS

| 6,481,333 | B1 * | 11/2002 | Akasaka | F04B 1/328 |
| | | | | 92/13.6 |
| 6,817,253 | B2 | 11/2004 | Gandrud | |
| 8,196,400 | B2 * | 6/2012 | Palo | E02F 9/2232 |
| | | | | 60/449 |

* cited by examiner

*Primary Examiner* — F Daniel Lopez (57) ABSTRACT

A pump, including: a cylinder block including two through-bores and two pistons disposed in the through-bores; a drive shaft to rotate the cylinder block; a swash plate to displace the pistons within the through-bores to draw fluid through an inlet port into the through-bores; and expel the fluid from the through-bores into the outlet port; a torque sensor arranged to measure torque on the drive shaft and transmit a torque signal, including the measured torque, to a processor; and an actuator to receive, from the processor, a control signal generated using the torque signal and pivot the swash plate about a first axis, transverse to the axis of rotation, or maintain a circumferential position of the swash plate about the first axis; or pivot the cylinder block about a second axis, transverse to the axis of rotation, or maintain a circumferential position of the cylinder block about the second axis.

16 Claims, 6 Drawing Sheets

VARIABLE DISPLACEMENT HYDRAULIC PUMP WITH TORQUE SENSING AND METHOD THEREOF

TECHNICAL FIELD

The present disclosure relates to a variable displacement hydraulic pump with torque sensing and a method thereof, in particular, a variable displacement hydraulic pump using torque sensing to attain or maintain a desired flow rate correlated to a known torque level on a drive shaft for the pump.

BACKGROUND

Known variable flow hydraulic pumps use an auxiliary hydraulic control piston or an electromechanical controller to control the flow rate for the pump. Feedback for control of the piston is typically provided by down-stream (of the pump outlet) measurements of pressure or flow. However, pressure in the control piston is affected by the overall pressure in the hydraulic system, for example to due to activation of various hydraulic components. Changes in the overall pressure cause deviations in the position of the piston, which in turn affects the flow rate of the pump. The control piston can be made more precise by using an electromechanical actuator, but the control loop still has errors and lag induced by the down-stream measurement of pressure or flow. Thus, it is difficult to quickly and accurately attain or maintain a desired flow rate for known variable flow hydraulic pumps.

SUMMARY

According to aspects illustrated herein, there is provided a variable displacement axial pump, including: an inlet port; an outlet port; a cylinder block including first and second through-bores and first and second pistons at least partly disposed in the first and second through-bores, respectively; a drive shaft arranged to rotate the cylinder block; an axis of rotation for the drive shaft; a swash plate engaged with the first and second pistons and arranged to displace the first and second pistons within the first and second through-bores, respectively, to draw fluid through the inlet port into the first and second through-bores; and expel the fluid from the first and second through-bores into the outlet port; a torque sensor arranged to measure torque on the drive shaft; and transmit a torque signal, including the measured torque, to a processor; and an actuator. The actuator is arranged to receive, from the processor, a control signal generated using the torque signal and: pivot the swash plate about a first axis, transverse to the axis of rotation, or maintain a circumferential position of the swash plate about the first axis; or pivot the cylinder block about a second axis, transverse to the axis of rotation, or maintain a circumferential position of the cylinder block about the second axis.

According to aspects illustrated herein, there is provided a variable displacement hydraulic pump, including: an inlet port; an outlet port; a cylinder block including first and second through-bores and first and second pistons at least partly disposed in the first and second through-bores, respectively; a drive shaft arranged to rotate the cylinder block; an axis of rotation for the drive shaft; a swash plate engaged with the first and second pistons; and arranged to displace the first and second pistons within the first and second through-bores, respectively, to draw fluid through the inlet port into the first and second through-bores; and expel the fluid from the first and second through-bores into the outlet port; a torque sensor arranged to measure torque on the drive shaft; and transmit a torque signal, including a torque measurement, to a processor; and an actuator. The actuator is arranged to receive, from the processor, a control signal generated using the torque signal and: pivot the swash plate about a first axis, transverse to the axis of rotation; or maintain a circumferential position of the swash plate about a first axis, transverse to the axis of rotation.

According to aspects illustrated herein, there is provided a variable displacement hydraulic pump, including: an inlet port; an outlet port; a cylinder block including first and second through-bores and first and second pistons at least partly disposed in the first and second through-bores, respectively; a drive shaft arranged to rotate the cylinder block; an axis of rotation for the drive shaft; a swash plate engaged with the first and second pistons and arranged to displace the first and second pistons within the first and second through-bores, respectively, to draw fluid through the inlet port into the first and second through-bores; and expel the fluid from the first and second through-bores into the outlet port; a torque sensor arranged to measure torque on the drive shaft; and transmit a torque signal, including a torque measurement, to a processor; and an actuator. The actuator is arranged to: receive, from the processor, a control signal generated using the torque signal and: pivot the cylinder block about a first axis, transverse to the axis of rotation; or maintain a circumferential position of the swash plate about a first axis, transverse to the axis of rotation.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
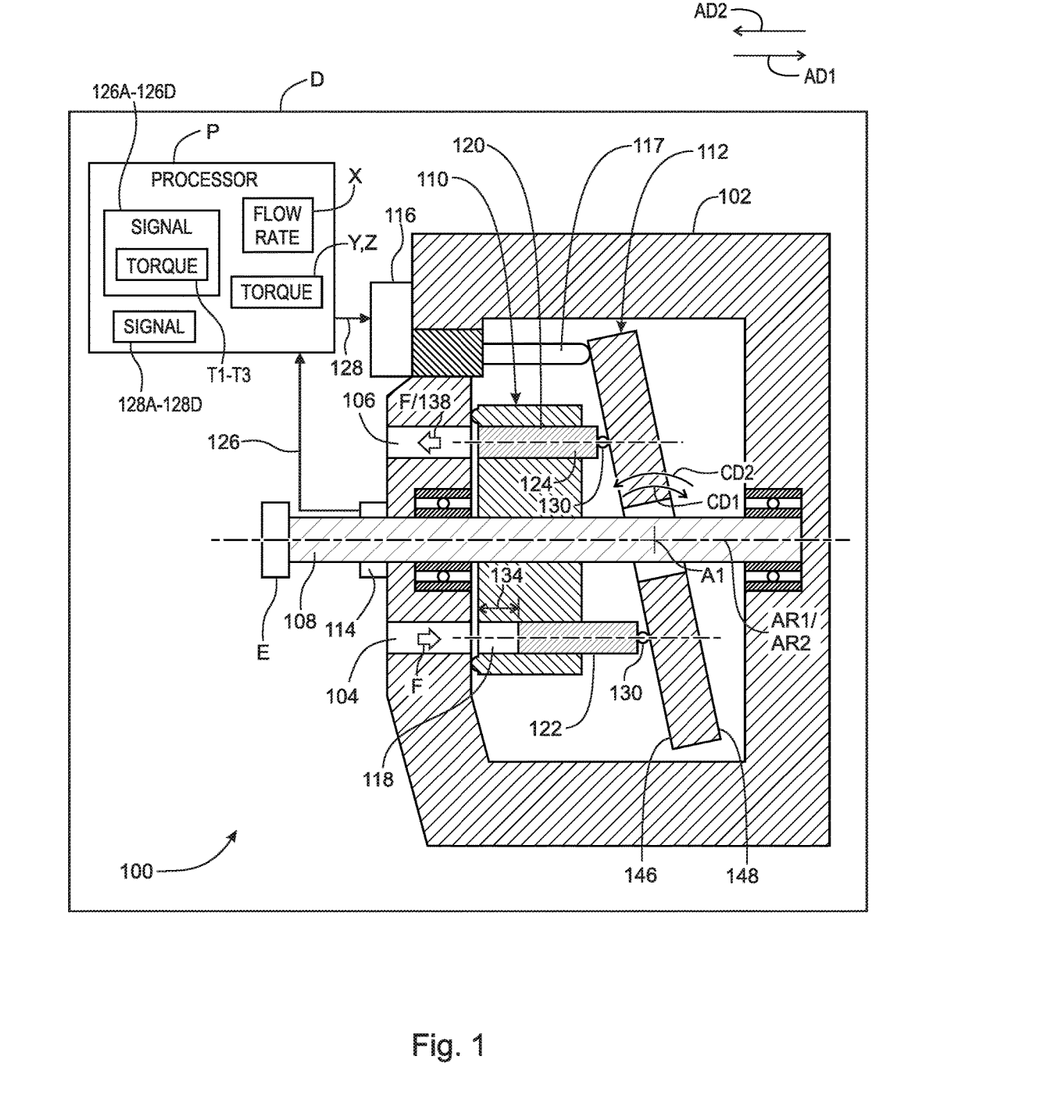
FIG. 1 is a block diagram of a variable displacement axial pump with a pivoting swash plate and torque sensing.

FIG. 1 is a block diagram of variable displacement axial pump 100 with a pivoting swash plate and torque sensing. Pump 100 includes: housing 102; inlet port 104; outlet port 106; drive shaft 108; axis of rotation AR1 for shaft 108; cylinder block 110 non-rotatably connected to shaft 108; axis of rotation AR2 for block 110; swash plate 112; torque sensor 114; and electromechanical actuator 116. In an example embodiment, arm 117 connects actuator 116 to plate 112.

Block 110 includes: through-bores 118 and 120; and pistons 122 and 124 engaged with swash plate 112 and at least partly disposed in through-bores 118 and 120, respectively. Axis AR1 and AR2 are co-linear. Swash plate 112 does not rotate about axis AR1 or AR2. Swash plate 112 is arranged to displace pistons 122 and 124 within through-bores 118 and 120, respectively, to draw fluid F through port 104 into through-bores 118 and 120 and to expel fluid F from through-bores 118 and 120 into port 106. Actuator 116 can be any electromechanical actuator known in the art. In an example embodiment, torque sensor 114 is a non-contact inverse magnetostriction torque sensor.

By "non-rotatably connected" elements, we mean that: the elements are connected so that whenever one of the elements rotates, all the elements rotate; and relative rotation between the elements is not possible. Radial and/or axial movement of non-rotatably connected elements with respect to each other is possible, but not required.

Pump 100 is located in device D (for example, a bulldozer, tractor, or construction equipment). Shaft 108 is rotated by engine E of device D. Torque sensor 114 is arranged to sense torque on shaft 108 and transmit torque signal 126, representing the torque on shaft 108 to processor P. That is, torque sensor 114 measures torque directly on drive shaft 108. Processor P is part of device D, for example is an electronic control unit for device D.

Actuator 116 is arranged to receive, from processor P, control signal 128, generated by processor P using torque signal 126. Actuator 116 is arranged to: pivot swash plate 112 about axis A1, transverse to axis of rotation AR1, according control signal 128; or maintain a circumferential position of swash plate 112, about axis A1, according to control signal 128. That is, actuator 116 is arranged to selectively pivot swash plate about axis A1 according to control signal 128.

Pistons 122 and 124 are engaged with plate 112. Pistons 122 and 124 remain engaged to plate 112 as is known in the art. In an example embodiment, each of pistons 122 and 124 is connected to swash plate 112 via a respective retention assembly 130, as is known in the art. In an example embodiment (not shown) fluids at ports 104 and 106 are pressurized to force pistons 122 and 124 into contact with plate 112 during rotation of block 110 about axis AR1/AR2. For example, assemblies 130 are not used to maintain connection between the pistons and plate 112.

As cylinder block 110 rotates about axis AR1 and AR2: when piston 122 or 124 is aligned with port 104, plate 112 has displaced piston 122 or 124 in direction AD1, within through-bores 118 or 120, respectively, to create suction and draw fluid F into through-bore 118 or 120 through port 104; and when piston 122 or 124 is aligned with port 106, plate 112 has displaced piston 122 or 124 in direction AD2, within through-bores 118 or 120, respectively, to expel fluid F from through-bore 118 or 120 into port 106 at a flow rate. In FIG. 1, the flow rate is flow rate 132.

A flow rate at which fluid F is drawn into and expelled from pump 100 is dependent upon the speed of rotation of block 110 and the displacement of pistons 122 and 124, by plate 112, within through-bores 118 and 120, respectively. The speed of rotation of block 110 is a function of engine E, which is determined by operations other than those for pump 100. That is, the speed of rotation is not controllable by pump 100. For a given position of plate 112 about axis A1, increasing and decreasing the speed of rotation of block 110 increases and decreases rate 132, respectively.

A flow rate for pump 100 is also governed by the circumferential position of plate 112 with respect to axis A1. The circumferential position of plate 112 determines the distance that pistons 122 and 124 are displaced by plate 112 within through-bores 118 and 120, respectively. In the example of FIG. 1, pistons 122 and 124 are displaced distance 134 by plate 112 within through-bores 118 and 120, respectively. Thus, pistons 122 and 124 displace distance 134 to draw fluid F into through-bores 118 and 120, respectively, and pistons 122 and 124 displace distance 134 to expel fluid F from through-bores 118 and 120, respectively.

As discussed below, changing the extent of the axial displacement of pistons 122 and 124 (for example, distance 134) changes the amount of fluid F drawn into and expelled by block 110 and hence changes flow rate 132.

Figure 2:
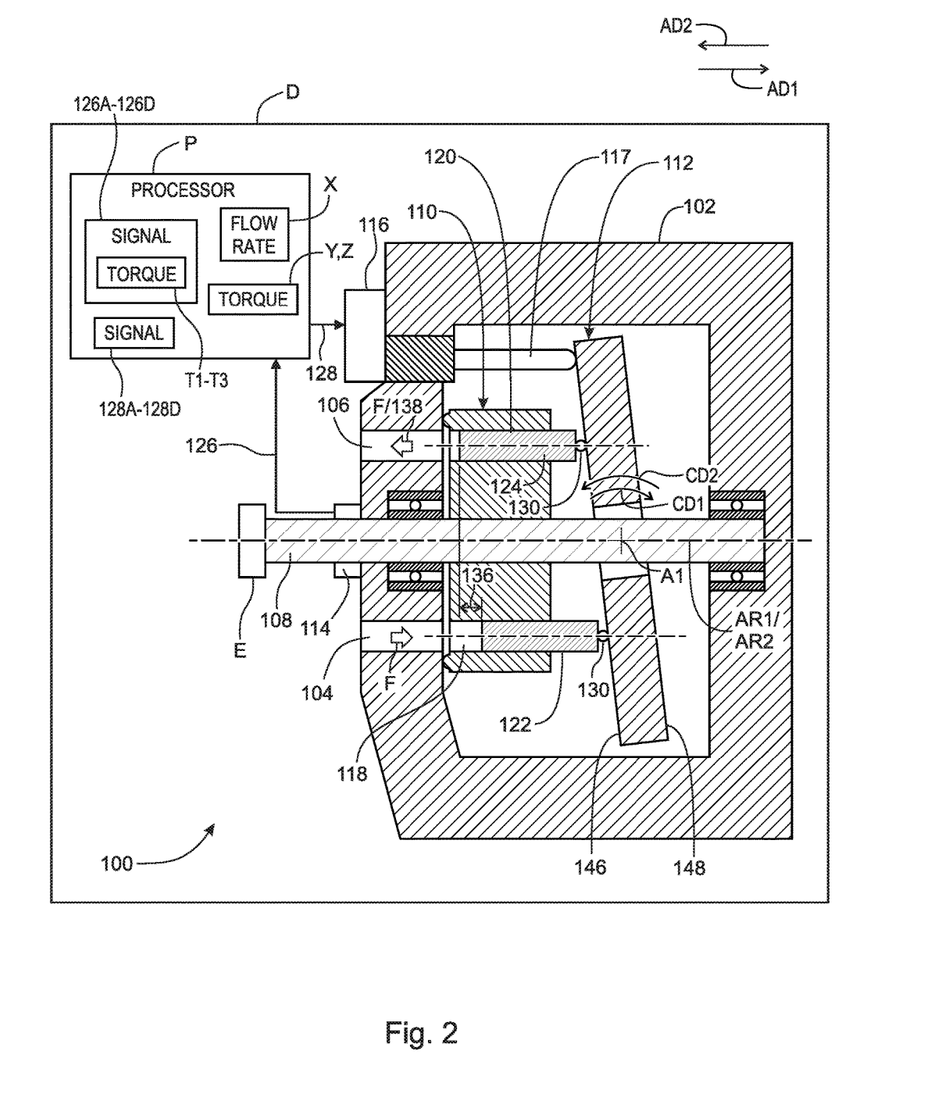
FIG. 2 shows the pump of FIG. 1 with the swash plate pivoted.

FIG. 2 shows variable displacement axial pump 100 of FIG. 1 with swash plate 112 pivoted. In the example of FIG. 2, swash plate 112 has been rotated in direction CD1 about axis A1 from the position shown in FIG. 1. The alignment of through-bores 118 and 120 with ports 104 and 106 remains the same. The rotation and subsequent tilting of swash plate 112 in FIG. 2 changes the axial displacement of pistons 122 and 122. As a result: pistons 122 and 124 are displaced distance 136 by plate 112. In the example of FIGS. 1 and 2: distance 136 is less than distance 134.

Assuming a constant speed of rotation of shaft 108 in FIGS. 1 and 2, and since distance 136 is less than distance 134, the amount of fluid F drawn into and expelled from through-bores 118 and 120 in FIG. 2 decreases in comparison to the amount of fluid F drawn into through-bores 118 and 120 in FIG. 1. Thus flow rate 138 in FIG. 2 is less than rate 132 in FIG. 1.

The following discussion is directed to a transition from FIG. 2 to FIG. 1. To transition from FIG. 2 to FIG. 1, swash plate 112 is pivoted by actuator 116 about axis A1 in direction CD2. Assuming a constant speed of rotation of shaft 108 in FIGS. 1 and 2, and since distance 136 is less than distance 134, the amount of fluid F drawn into and expelled from through-bores 118 and 120 in FIG. 1 increases in comparison to the amount of fluid F drawn into through-bores 118 and 120 in FIG. 2. Thus rate 132 in FIG. 1 is greater than rate 138 in FIG. 2.

Torque on shaft 108 is related to flow rates for pump 100. For example: increasing the flow rate increases torque on shaft 108; and decreasing the flow rate decreases torque on shaft 108. As further discussed below, the torque sensed by sensor 114 on shaft 108 is used as feedback input to control the flow rate, for example flow rate 132 or 138.

The use of torque sensor 114 and signals 126 and 128 enables pump 100 to quickly and accurately change a particular flow rate for pump 100 to a different and desired flow rate, or to maintain a particular flow rate despite changes in the speed of rotation of block 110.

In an example embodiment, for a particular configuration of pump 100, flow rates for pump 100 are correlated in processor P to torque levels on shaft 108 and to a speed of rotation of shaft 108. For example: for a first speed of rotation of shaft 108, flow rate X for pump 100 is correlated to torque level Y on shaft 108; and for a second speed of rotation of shaft 108, flow rate X for pump 100 is correlated to torque level Z on shaft 108:

1. To attain flow rate X at the first speed of rotation, plate 112 is pivoted until sensor 114 senses torque level Y, and pivoting of plate 112 is ceased when torque level Y is sensed.
2. To maintain flow rate X when the first speed or rotation changes to the second speed of rotation, plate 112 is pivoted until sensor 114 senses torque level Z, and pivoting of plate 112 is ceased when torque level Z is sensed.

Figure 3:
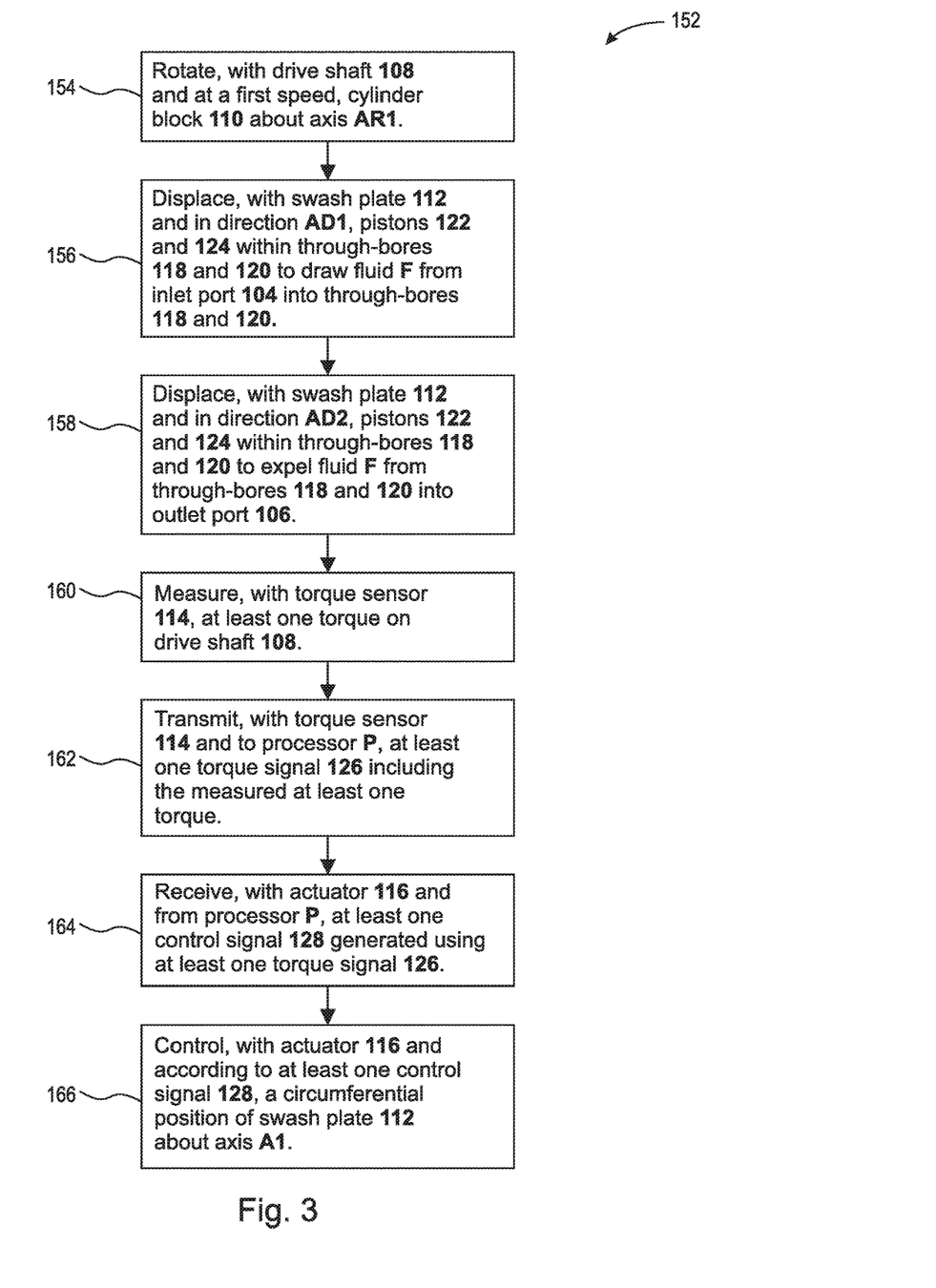
FIG. 3 shows a flow chart for a method of pumping fluid with the variable displacement axial pump of FIG. 1.

FIG. 3 shows flow chart 152 for a method of pumping fluid with variable displacement axial pump—100 of FIG. 1. Although the method is presented as a sequence of steps for clarity, no order should be inferred from the sequence unless explicitly stated. Step 154 rotates, with drive shaft 108 and at a first speed, cylinder block 110 about axis AR1. Step 156 displaces, with swash plate 112 and in direction AD1, pistons 122 and 124 within through-bores 118 and 120, respectively, to draw fluid F from inlet port 104 into through-bores 118 and 120. Step 158 displaces, with swash plate 112 and in direction AD2, pistons 122 and 124 within through-bores 118 and 120, respectively, to expel fluid F from through-bores 118 and 120 into outlet port 106. Step 160 measures, with torque sensor 114, at least one torque on drive shaft 108. Step 162 transmits, with torque sensor 114 and to processor P, at least one torque signal 126 including the measured at least one torque. Step 166 receives, with actuator 116 and from processor P, at least one control signal 128 generated using at least one torque signal 126. Step 168 controls, with actuator 116 and according to at least one control signal 128, a circumferential position of swash plate 112 about axis A1.

In an example embodiment, controlling, with actuator 116 and according to at least one torque signal 126, a circumferential position of swash plate 112 about axis A1 includes pivoting, with actuator 116, swash plate 112 about axis A1 to change torque T1 on drive shaft 108 to torque T2 on drive shaft 108; or maintaining, with actuator 116, a circumferential position of swash plate 112 about axis A1 to maintain torque T1 on drive shaft 108. For example, in the first instance, flow rate associated with torque T1 is changed to a flow rate associated with torque T2. For example, in the second instance, the goal is to maintain a flow rate associated with torque T1. As discussed below, maintaining a flow rate can be in response to changes in other system parameters such as the speed of rotation of shaft 108.

In the discussion that follows, capital letters are used to designate a specific component from a group of components otherwise designated by a three digit number, for example, in the discussion below, signals 126A through 126D are specific examples of signal 126. In an example embodiment, pivoting, with actuator 116, swash plate 112 about axis A1 to change torque T1 on drive shaft 108 to a torque T2 on drive shaft 108 includes: measuring, with torque sensor 114, torque T1 on drive shaft 108; transmitting, with torque sensor 114 and to processor P, torque signal 126A including measured torque T1; receiving, with actuator 116 and from processor P, control signal 128A; pivoting, with actuator 116 and according to control signal 128A, swash plate 112 about axis A1; measuring, with torque sensor 114, torque T2 on drive shaft 108; transmitting, with torque sensor 114 and to processor P, torque signal 126B including measured torque T2; receiving, with actuator 116 and from processor P, control signal 128B; and ceasing to pivot, with actuator 116, swash plate 112 about axis A1. In general, control signals 128 instruct actuator 116 to pivot or stop pivoting swash plate 112 about axis A1.

When torque T2 is greater than torque T1, pivoting, with actuator 116, swash plate 112 about axis A1 includes pivoting, with actuator 116, swash plate 112 about axis A1 in circumferential direction CD2. When torque T2 is less than torque T1, pivoting, with actuator 116, swash plate 112 about axis A1 includes pivoting, with actuator 116, swash plate 112 about axis A1 in circumferential direction CD1.

In an example embodiment, engine E rotates drive shaft 108 and block 110 at a second rotational speed, different from the first rotational speed. That is, the rotational speed of shaft 108 is changed. Maintaining, with actuator 116 torque T1 on drive shaft 108 includes: measuring, with torque sensor 114, torque T3 on drive shaft 108; transmitting, using torque sensor 114 and processor P, torque signal 126C including measured torque T3; receiving, with actuator 116 and from processor P, control signal 128C; pivoting, with actuator 116, swash plate 112 about axis A1; measuring with torque sensor 114, torque T1, on drive shaft 108; transmitting, with torque sensor 114 and to processor P, torque signal 126D including measured torque T1; receiving, with actuator 116 and from processor P, control signal 128D; and ceasing to pivot, with actuator 116, swash plate 112 about axis A1.

When torque T2 is greater than torque T1, pivoting, with actuator 116, swash plate 112 about axis A1 includes pivoting, with actuator 116, swash plate 112 about axis A1 in circumferential direction CD1. When torque T2 is less than torque T1, pivoting, with actuator 116, swash plate 112 about axis A1 includes pivoting, with actuator 116, swash plate 112 about axis A1 in circumferential direction CD2.

Figure 4:
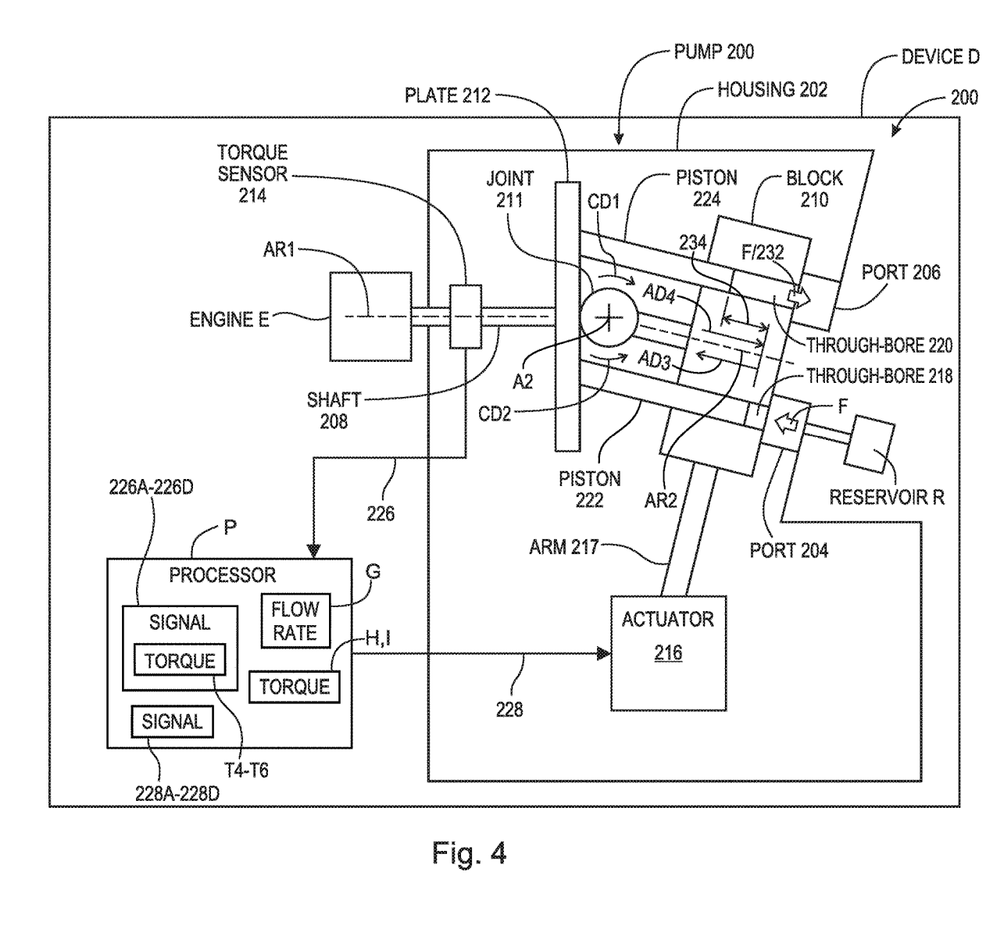
FIG. 4 is a block diagram of a variable displacement bent-axis pump with torque sensing.

FIG. 4 is a block diagram of variable displacement bent-axis pump 200. Pump 200 includes: housing 202; inlet port 204, outlet port 206; shaft 208 with axis of rotation AR1; cylinder block 210 with axis of rotation AR2; universal joint 211 connecting block 210 to shaft 208; swash plate 212 non-rotatably connected to shaft 208; torque sensor 214; and electromechanical actuator 216. In an example embodiment, pump 200 includes arm 217 connecting actuator 216 to plate 212. Block 210 includes: through-bores 218 and 220; and pistons 222 and 224 engaged with swash plate 212 and at least partly disposed in through-bores 218 and 220, respectively. Cylinder block 210 rotates with shaft 208 and about axis AR2 due to the action of joint 211. Axis AR2 is displaceable in directions CD1 and CD2 with respect to axis AR1. Actuator 216 can be any electromechanical actuator known in the art. In an example embodiment, torque sensor 214 is a non-contact inverse magnetostriction torque sensor.

Swash plate 212 is arranged to displace pistons 222 and 224 within through-bores 218 and 220, respectively, to draw fluid F through port 204 into through-bores 218 and 220 and to expel fluid F from through-bores 218 and 220 into port 206.

Swash plate 212 rotates with shaft 208. Pistons 222 and 224 remain engaged to plate 214 as is known in the art. Block 210 rotates about axis AR2 with shaft 208 and plate 212. As plate 212 rotates about axis AR1 and cylinder block 210 rotates about axis AR2: when piston 222 or 224 is aligned with port 204, plate 212 displaces piston 222 or 224 in direction AD3, within through-bores 218 or 220, respectively, to draw fluid F into through-bore 218 or 220 through port 204 (the displacement creates suction at port 204); and when piston 222 or 224 is aligned with port 206, plate 212 displaces piston 222 or 224 in direction AD4, within through-bores 218 or 220, respectively, to expel fluid F from through-bore 218 or 220 into port 206.

Pump 200 is located in device D (for example, a bulldozer, tractor, or construction equipment). Shaft 208 is rotated by engine E of device D. Torque sensor 214 is arranged to sense torque on shaft 208 and transmit torque signal 226, representing the torque, to processor P. Processor P is part of device D, for example is an electronic control unit for device D.

Actuator 216 is arranged to receive, from processor P, control signal 228, generated by processor P using torque signal 226. Actuator 216 is arranged to: pivot cylinder block 210 about axis A2, transverse to axis of rotation AR1, according control signal 228; or maintain a circumferential position of cylinder block 210, about axis A2, according to control signal 228.

A flow rate at which fluid is drawn into and expelled from pump 200 is dependent upon the speed of rotation of shaft 208 and the displacement of pistons 222 and 224, by plate 212, within through-bores 218 and 220, respectively. The speed of rotation of block 210 is a function of engine E, which is determined by operations other than those for pump 200. That is, the speed of rotation is not controllable by pump 200. For a given position of block 210 about axis A2, increasing or decreasing the speed of rotation of block 210 increases or decreases flow rate 232, respectively.

A flow rate for pump 200 is also governed by the circumferential position of block 210 with respect to axis A2. The circumferential position of block 210 determines the distance that pistons 222 and 224 are displaced by plate 212 within through-bores 218 and 220, respectively. In the example of FIG. 4, pistons 222 and 224 are displaced distance 234 by plate 212 within through-bores 218 and 220, respectively. Thus, pistons 222 and 224 displace distance 234 to draw fluid F into through-bores 218 and 220, respectively, and pistons 222 and 224 displace distance 234 to expel fluid F from through-bores 218 and 220, respectively.

As discussed below, changing the extent of the axial displacement of pistons 222 and 224 (for example, distance 234) changes the amount of fluid F drawn into and expelled by block 210 and hence changes flow rate 232.

Figure 5:
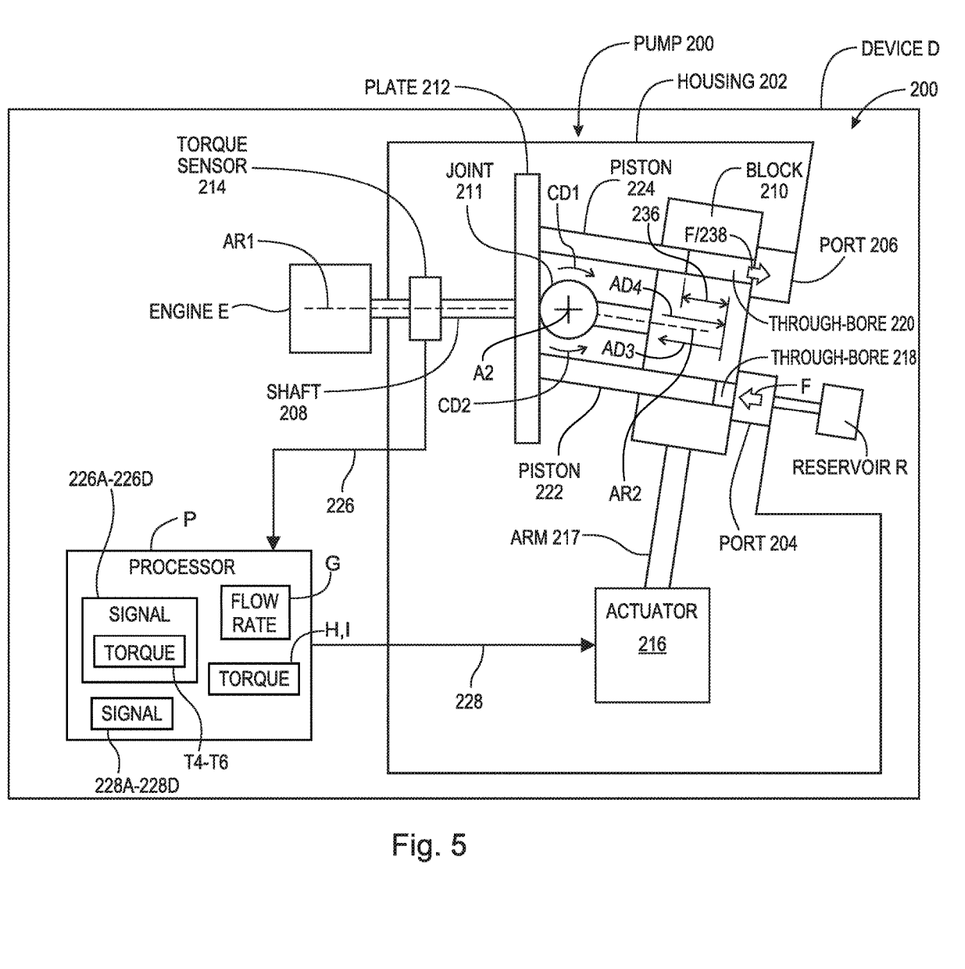
FIG. 5 shows the pump of FIG. 4 with a cylinder block pivoted.

FIG. 5 shows variable displacement bent-axis pump 200 of FIG. 4 with block 210 pivoted. In the example of FIG. 5, block 210 has been rotated in direction CD2 about axis A2 from the position shown in FIG. 4. The alignment of through-bores 218 and 220 with ports 204 and 206 remains the same. The rotation and subsequent tilting of swash plate 212 in FIG. 5 changes the axial displacement of pistons 222 and 222 by plate 212. As a result: pistons 222 and 224 are displaced distance 236 by plate 212. In the example of FIGS. 4 and 5: distance 236 is less than distance 234.

Assuming a constant speed of rotation of shaft 208 in FIGS. 4 and 5, and since distance 236 is less than distance 234, the amount of fluid F drawn into and expelled from through-bores 218 and 120 in FIG. 5 decreases in comparison to the amount of fluid F drawn into through-bores 218 and 220 in FIG. 4. Thus flow rate 238 in FIG. 5 is less than rate 232 in FIG. 4.

The following discussion is directed to a transition from FIG. 5 to FIG. 4. To transition from FIG. 5 to FIG. 4, block 210 is pivoted about axis A2 in direction CD1. Assuming the constant speed of rotation of shaft 208 in FIGS. 4 and 5, and since distance 236 is less than distance 234, the amount of fluid F drawn into and expelled from through-bores 218 and 220 in FIG. 4 increases in comparison to the amount of fluid F drawn into through-bores 218 and 220 in FIG. 5. Thus rate 232 in FIG. 4 is greater than rate 238 in FIG. 5.

Torque on shaft 208 is related to flow rates for pump 200. For example: increasing the flow rate increases torque on shaft 208; and decreasing the flow rate decreases torque on shaft 208. For example, in the first instance, flow rate associated with torque T4 is changed to a flow rate associated with torque T5. For example, in the second instance, the goal is to maintain a flow rate associated with torque T4. As discussed below, maintaining the flow rate can be in response to changes in other system parameters such as the speed of rotation of shaft 208. As further discussed below, the torque sensed by sensor 214 on shaft 208 is used as feedback input to control the flow rate, for example rate 232 or 238.

The use of torque sensor 214 and signals 226 and 228 enables pump 200 to quickly and accurately change a particular flow rate for pump 200 to a different and desired flow rate, or to maintain the particular flow rate despite changes in the speed of rotation of block 210.

In an example embodiment, for a particular configuration of pump 200, flow rates for pump 200 are correlated in processor P to torque levels on shaft 208 and to a speed of rotation of shaft 208. For example if: for a first speed of rotation of shaft 208, flow rate G for pump 200 is correlated to torque level H on shaft 208; and for a second speed of rotation of shaft 208, flow rate G for pump 200 is correlated to torque level I on shaft 208:
1. To attain flow rate G at the first speed of rotation of shaft 208, plate 212 is pivoted until sensor 214 senses torque level H, and pivoting of plate 212 is ceased when torque level H is sensed.
2. To maintain flow rate G when the first speed of rotation of shaft 208 changes to the second speed of rotation, plate 212 is pivoted until sensor 214 senses torque level I, and pivoting of plate 212 is ceased when torque level I is sensed.

Figure 6:
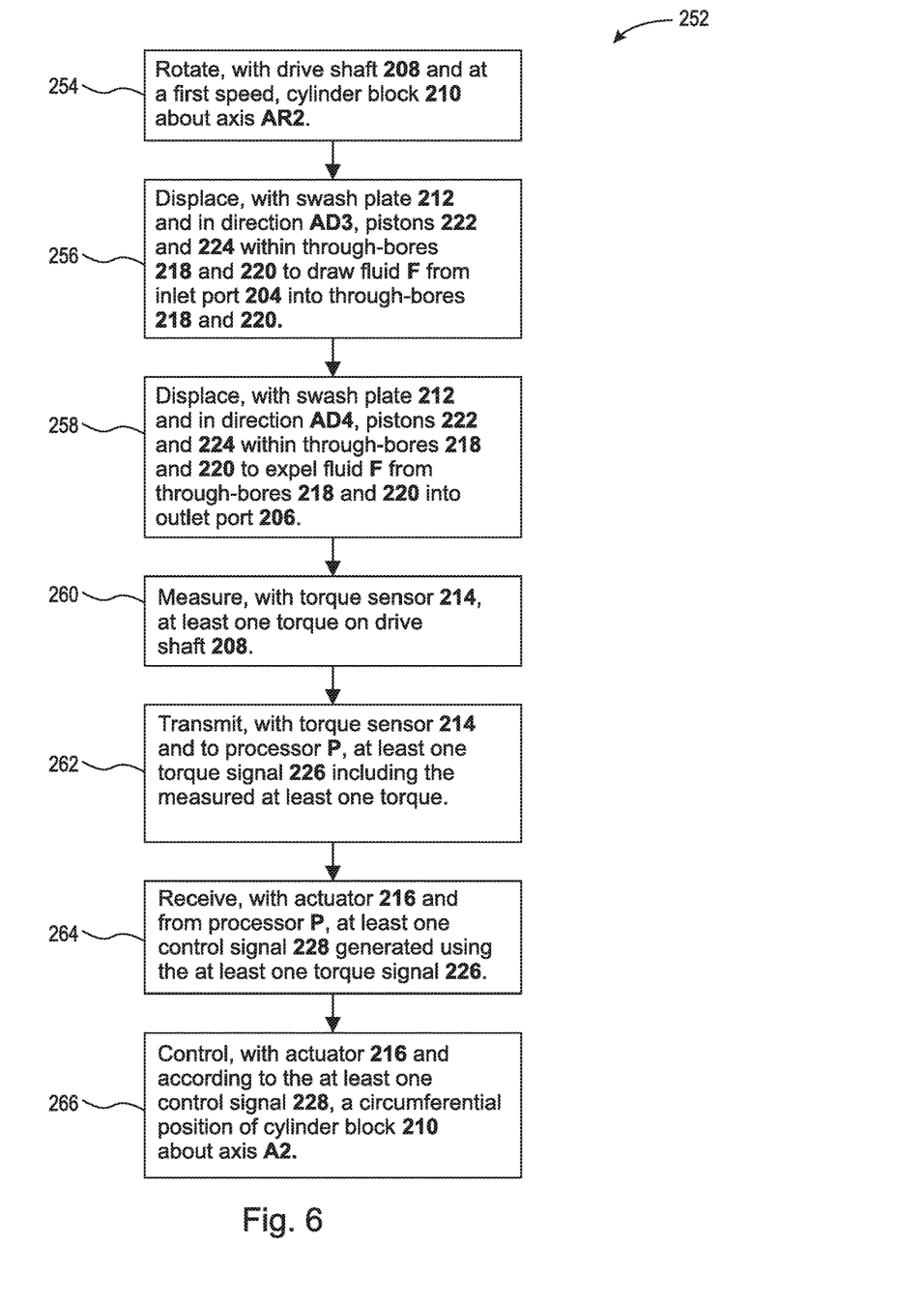
FIG. 6 shows a flow chart for a method of pumping fluid with the variable displacement bent-axis pump of FIG. 4.

FIG. 6 shows flow chart 252 for a method of pumping fluid with variable displacement bent-axis pump 200 of FIG. 4. Although the method is presented as a sequence of steps for clarity, no order should be inferred from the sequence unless explicitly stated. Step 254 rotates, with drive shaft 208 and at a first speed, cylinder block 210 about axis AR2. Step 256 displaces, with swash plate 212 and in direction AD3, pistons 222 and 224 within through-bores 218 and 220 to draw fluid F from inlet port 204 into through-bores 218 and 220. Step 258 displaces, with swash plate 212 and in direction AD4, pistons 222 and 224 within through-bores 218 and 220 to expel fluid F from through-bores 218 and 220 into outlet port 206. Step 260 measures, with torque sensor 214, at least one torque on drive shaft 208. Step 262 transmits, with torque sensor 214 and to processor P, at least one torque signal 226 including the measured at least one torque. Step 264 receives, with actuator 216 and from processor P, at least one control signal 228 generated using the at least one torque signal 226. Step 266 step controls, with actuator 216 and according to the at least one control signal 228, a circumferential position of cylinder block 210 about axis A2.

In an example embodiment, controlling, with actuator 216 and according to the at least one torque signal 226, a circumferential position of cylinder block 210 about axis A2 includes pivoting, with actuator 216, cylinder block 210 about axis A2 to change torque T4 on drive shaft 208 to torque T5 on drive shaft 208; or maintaining, with actuator 216, the circumferential position of cylinder block 210 about axis A2 to maintain torque T4 on drive shaft 208.

In an example embodiment, pivoting, with actuator 216, cylinder block 210 about axis A2 to change torque T4 on drive shaft 208 to torque T5 on drive shaft 208 includes: measuring, with torque sensor 214, torque T4 on drive shaft 208; transmitting, with torque sensor 214 and to processor P, torque signal 226A including measured torque T4; receiving, with actuator 216 and from processor P, control signal 228A; pivoting, with actuator 216 and according to control signal 228A, cylinder block 210 about axis A2; measuring, with torque sensor 214, torque T5 on drive shaft 208; transmitting, with sensor 214 and to processor P, torque signal 226B including measured torque T5; receiving, with actuator 216 and from processor P, control signal 228B; and ceasing to pivot, with actuator 216 and according to signal 228B, cylinder block 210 about axis A2. In general, control signals 228 instruct actuator 216 to pivot or stop pivoting cylinder block 210 about axis A2.

When torque T5 is greater than torque T4, pivoting, with actuator 216, cylinder block 210 about axis A2 includes pivoting, with actuator 216, cylinder block 210 about axis A2 in circumferential direction CD1. When torque T5 is less than torque T4, pivoting, with actuator 216, cylinder block 210 about axis A2 includes pivoting, with actuator 216, cylinder block 210 about axis A2 in circumferential direction CD2.

In an example embodiment, engine E rotates drive shaft 208 and block 210 at a second rotational speed, different from the first rotational speed. Maintaining, with actuator 216, the circumferential position of cylinder block 210 about axis A2 to maintain torque T4 on drive shaft 208 includes: measuring, with torque sensor 214, torque T6 on drive shaft 208; transmitting, using torque sensor 214 and processor P, torque signal 226C including measured torque T6; receiving, with actuator 216 and from processor P, control signal 228C; pivoting, with actuator 216, cylinder block 210 about axis A2; measuring with torque sensor 214, torque T4, on drive shaft 208; transmitting, with torque sensor 214 and to processor P, torque signal 226D including measured torque T4; receiving, with actuator 216 and from processor P, control signal 228D; and ceasing to pivot, with actuator 216, cylinder block 210 about axis A2.

When torque T6 is greater than torque T4, pivoting, with actuator 216, cylinder block 210 about axis A2 includes pivoting, with actuator 216, cylinder block 210 about axis A2 in circumferential direction CD2. When torque T6 is less than torque T4, pivoting, with actuator 216, cylinder block 210 about axis A2 includes pivoting, with actuator 216, cylinder block 210 about axis A2 in circumferential direction CD1.

Pumps 100 and 200 resolve the problem of quickly and accurately attaining or maintaining a desired flow rate. Specifically, torque sensors 114 and 214 provide an in-stream measurement related to flow rate for pumps 100 and 200, rather than relying the down-stream parameters (pressure or flow) used by known variable flow hydraulic pumps. Further, torque sensors are more robust than pressure and flow sensors and provide more accurate feedback.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

A1 axis transverse to axis AR1 and AR2
A2 axis transverse to axis AR1 and AR2
AD1 axial direction
AD2 axial direction
AD3 axial direction
AD4 axial direction
AR1 axis of rotation for shafts 108 and 208
AR2 axis of rotation for cylinder blocks 110 and 210
CD1 circumferential direction about axis A
CD2 circumferential direction about axis A
D device housing pump 100 or pump 200
E engine for device D
F fluid
G flow rate
H torque
I torque
P processor
R reservoir for fluid F
T1-T3 torque on shaft 108
T4-T6 torque on shaft 208
X flow rate
Y torque
Z torque
100 axial pump
102 housing
104 inlet port
106 outlet port
108 shaft
110 cylinder block
112 swash plate
114 torque sensor
116 actuator
117 arm
118 through-bore
120 through-bore
122 piston
124 piston
126 torque signal
126A-126D torque signal
128 control signal
128A-D control signal
130 retention assembly
132 flow rate
134 distance
136 distance
138 flow rate
152 flow chart
154 step in flow chart 152
156 step in flow chart 152
158 step in flow chart 152
160 step in flow chart 152
162 step in flow chart 152
164 step in flow chart 152
166 step in flow chart 152
200 bent-axis pump
202 housing
204 port
206 port
208 shaft
210 cylinder block
211 universal joint
212 swash plate
214 torque sensor
216 actuator
217 arm
218 through-bore
220 through-bore
222 piston
224 piston 226 torque signal
226A-226D torque signal
228 control signal
228A-228D control signal
232 flow rate
234 distance
236 distance
238 flow rate
252 flow chart
254 step in flow chart 252
256 step in flow chart 252
258 step in flow chart 252
260 step in flow chart 252
262 step in flow chart 252
264 step in flow chart 252
266 step in flow chart 252

The invention claimed is:

1. A variable displacement hydraulic pump, comprising:
an inlet port;
an outlet port;
a cylinder block including:
  first and second through-bores; and,
  first and second pistons at least partly disposed in the first and second through-bores, respectively;
a drive shaft non-rotatably connected to the cylinder block, arranged to be rotated by an engine, and arranged to rotate the cylinder block;
an axis of rotation for the drive shaft;
a swash plate engaged with the first and second pistons and arranged to displace the first and second pistons within the first and second through-bores, respectively, to:
  draw fluid through the inlet port into the first and second through-bores; and,
  expel the fluid from the first and second through-bores into the outlet port; and,
a torque sensor arranged to:
  measure a torque directly on the drive shaft; and,
  transmit a torque signal, including the measured torque, to a processor, wherein the variable displacement hydraulic pump includes:
a first actuator arranged to:
  receive, from the processor, a control signal generated using the torque signal; and,
  selectively pivot the swash plate about a first axis, transverse to the axis of rotation for the drive shaft; or,
a second actuator arranged to:
  receive, from the processor, a control signal generated using the torque signal; and,
  selectively pivot the cylinder block about a second axis, transverse to the axis of rotation for the drive shaft.

2. The variable displacement hydraulic pump of claim 1, wherein the cylinder block includes an axis of rotation co-linear with the axis of rotation for the drive shaft.

3. The variable displacement hydraulic pump of claim 1, wherein:
the variable displacement hydraulic pump includes the second actuator; and,
the cylinder block includes an axis of rotation displaceable with respect to the axis of rotation for the drive shaft.

4. A method of using the variable displacement hydraulic pump of claim 1, wherein the variable displacement hydraulic pump includes the first actuator, the method comprising, pivoting, with the first actuator, the swash plate about the first axis to change a second torque on the drive shaft to a first torque on the drive shaft.

5. The method of claim 4, wherein pivoting, with the first actuator, the swash plate about the first axis to change the second torque on the drive shaft to the first torque on the drive shaft includes:
receiving, with the first actuator and from the processor, a first control signal; and,
pivoting, with the first actuator and according to the first control signal, the swash plate about the first axis, to return the torque on the drive shaft to the first torque.

6. The method of claim 5, wherein:
when the first torque is greater than the second torque, pivoting the swash plate about the first axis includes pivoting, with the first actuator, the swash plate about the first axis in a first circumferential direction; and,
when the first torque is less than the second torque, pivoting the swash plate about the first axis includes pivoting, with the first actuator, the swash plate about the first axis in a second circumferential direction, opposite the first circumferential direction.

7. A method of using the variable displacement hydraulic pump of claim 1, wherein the variable displacement hydraulic pump includes the second actuator, the method comprising pivoting, with the second actuator, the cylinder block about the second axis to change a second torque on the drive shaft to a first torque on the drive shaft.

8. The method of claim 7, wherein pivoting, with the second actuator, the cylinder block about the second axis to change the second torque on the drive shaft to the first torque on the drive shaft includes:
receiving, with the second actuator and from the processor, a first control signal; and,
pivoting, with the second actuator and according to the first control signal, the cylinder block about the second axis to return the torque on the drive shaft to the first torque.

9. The method of claim 8, wherein:
when the first torque is greater than the second torque, pivoting, with the second actuator and according to the first control signal, the cylinder block about the second axis includes pivoting, with the second actuator, the cylinder block about the second axis in a first circumferential direction; and,
when the first torque is less than the second torque, pivoting, with the second actuator and according to the first control signal, the cylinder block about the second axis includes pivoting, with the second actuator, the cylinder block about the second axis in a second circumferential direction, opposite the first circumferential direction.

10. The method of claim 7, further comprising:
changing a rotational speed of the drive shaft;
measuring, with the torque sensor, the second torque on the drive shaft;
transmitting, using the torque sensor and to the processor, a first torque signal including the measured second torque;
receiving, with the second actuator and from the processor, a first control signal; and,
pivoting, with the second actuator and according to the first control signal, the cylinder block about the second axis to return the torque on the drive shaft to the first torque.

11. A variable displacement hydraulic pump, comprising:
an inlet port;
an outlet port;

a cylinder block including:
  first and second through-bores; and,
  first and second pistons at least partly disposed in the first and second through-bores, respectively;
a drive shaft non-rotatably connected to the cylinder block and arranged to rotate the cylinder block;
an axis of rotation for the drive shaft;
a swash plate:
  engaged with the first and second pistons; and,
  arranged to displace the first and second pistons within the first and second through-bores, respectively, to:
    draw fluid through the inlet port into the first and second through-bores; and,
    expel the fluid from the first and second through-bores into the outlet port;
a torque sensor arranged to:
  measure a torque directly on the drive shaft; and,
  transmit a torque signal, including a torque measurement, to a processor; and,
an actuator arranged to:
  receive, from the processor, a control signal generated using the torque signal; and,
  selectively pivot the swash plate about a first axis, transverse to the axis of rotation for the drive shaft.

12. A method of using the variable displacement hydraulic pump of claim 11, wherein selectively pivoting the swash plate about the first axis includes pivoting the swash plate about the first axis, the method further comprising:
  prior to pivoting the swash plate about the first axis, expelling the fluid from the first and second through-bores into the outlet port at a first flow rate;
  after pivoting the swash plate about the first axis, measuring, with the torque sensor, a first torque on the drive shaft;
  expelling the fluid from the first and second through-bores into the outlet port at a second flow rate;
  transmitting, with the torque sensor and to the processor, a first torque signal including the measured first torque;
  receiving, with the actuator and from the processor, a first control signal generated using the first torque signal; and,
  ceasing to pivot, with the actuator and according to the first control signal, the swash plate about the first axis.

13. A method of using the variable displacement hydraulic pump of claim 11, comprising:
  measuring, using the torque sensor, a first torque directly on the drive shaft;
  changing a speed of rotation for the drive shaft;
  measuring, with the torque sensor, a second torque on the drive shaft;
  transmitting, with the torque sensor and to the processor, a first torque signal including the measured second torque;
  receiving, with the actuator and from the processor, a first control signal, generated using the first torque signal; and,
  pivoting, with the actuator and according to the first control signal, the swash plate about the first axis to return the torque on the drive shaft to the first torque.

14. A variable displacement hydraulic pump, comprising:
an inlet port;
an outlet port;
a cylinder block including:
  first and second through-bores; and,
  first and second pistons at least partly disposed in the first and second through-bores, respectively;
a drive shaft non-rotatably connected to the cylinder block and arranged to rotate the cylinder block;
an axis of rotation for the drive shaft;
a swash plate engaged with the first and second pistons and arranged to displace the first and second pistons within the first and second through-bores, respectively, to:
  draw fluid through the inlet port into the first and second through-bores; and,
  expel the fluid from the first and second through-bores into the outlet port;
a torque sensor arranged to:
  measure torque directly on the drive shaft; and,
  transmit a torque signal, including a torque measurement, to a processor; and,
an actuator arranged to:
  receive, from the processor, a control signal generated using the torque signal; and,
  selectively pivot the cylinder block about a first axis, transverse to the axis of rotation for the drive shaft.

15. A method of using the variable displacement hydraulic pump of claim 14, wherein selectively pivoting the cylinder block about the first axis includes pivoting the cylinder block about the first axis, the method further comprising:
  prior to pivoting the cylinder block about the first axis, expelling the fluid from the first and second through-bores into the outlet port at a first flow rate;
  after pivoting the cylinder block about the first axis, measuring, with the torque sensor, a first torque on the drive shaft;
  expelling the fluid from the first and second through-bores into the outlet port at a second flow rate associated with the measured first torque;
  transmitting, with the torque sensor and to the processor, a first torque signal including the measured first torque;
  receiving, with the actuator and from the processor, a first control signal, generated using the first torque signal; and,
  ceasing to pivot, with the actuator and according to the first control signal, the cylinder block about the first axis.

16. A method of using the variable displacement hydraulic pump of claim 14, comprising:
  measuring, using the torque sensor, a first torque directly on the drive shaft;
  changing a speed of rotation of the drive shaft;
  measuring, with the torque sensor, a second torque on the drive shaft;
  transmitting, with the torque sensor and to a processor, a first torque signal including the measured second torque;
  receiving, with the actuator and from the processor, a first control signal, generated using the first torque signal; and,
  pivoting, with the actuator and according to the first control signal, the cylinder block about the first axis to return the torque on the drive shaft to the first torque.

* * * * *